United States Patent

Kastner

[11] 4,192,994
[45] Mar. 11, 1980

[54] DIFFRACTOID GRATING CONFIGURATION FOR X-RAY AND ULTRAVIOLET FOCUSING

[75] Inventor: Sidney O. Kastner, Greenbelt, Md.

[73] Assignee: The United States of America as represented by the Administrator of the National Aeronautics and Space Administration, Washington, D.C.

[21] Appl. No.: 943,089

[22] Filed: Sep. 18, 1978

[51] Int. Cl.² .................... G01N 23/20; G21K 1/06
[52] U.S. Cl. .................... 250/280; 250/277 CH; 350/162 R; 356/334
[58] Field of Search ............ 250/280, 272, 273, 276, 250/505, 213 VT; 350/162 R, 3.7, 277 CH; 356/334

[56] References Cited

U.S. PATENT DOCUMENTS

| | | | |
|---|---|---|---|
| 3,639,759 | 2/1972 | Goshi et al. | 250/276 |
| 4,024,391 | 5/1977 | Bosserman et al. | 250/213 VT |
| 4,063,818 | 12/1977 | Lepere | 350/162 R |

Primary Examiner—Craig E. Church
Assistant Examiner—Thomas P. O'Hare
Attorney, Agent, or Firm—Robert D. Marchant; John R. Manning; John O. Tresansky

[57] ABSTRACT

There is disclosed herein an aspheric grating which is operable to image local or distant point sources sharply in a designated wavelength, i.e. produce a perfectly stigmatic image in the given wavelength at grazing angles of incidence. The grating surface comprises a surface of revolution defined by a curve which does not have a constant radius of curvature but is defined by a non-linear differential equation specified in terms of the diffraction condition expressed as $(m\lambda/\sigma)^2 = A > 0$ where m is the diffraction order, $\lambda$ is the wavelength and $\sigma$ is the grating surface ruling interval.

13 Claims, 6 Drawing Figures

DIFFRACTOID GRATING CONFIGURATION FOR X-RAY AND ULTRAVIOLET FOCUSING

ORIGIN OF THE INVENTION

The invention described herein was made by an employee of the United States government and may be manufactured and used by or for the Government for governmental purposes without the payment of any royalties thereon or therefor.

BACKGROUND OF THE INVENTION

This invention relates generally to grazing incidence optics and more particularly to a diffraction surface grating for obtaining stigmatic imaging.

While the use of uniform curvature concave gratings in grazing incidence optics is well known for focusing both near and remote sources of radiation in the region of the electromagnetic spectrum which includes extreme ultraviolet and soft X-ray radiation, imaging and/or spectral analysis of such radiation is made difficult by the requirement of grazing angle incidence to achieve reasonable reflected intensities, the reason being that such apparatus is unable to focus a plurality of parallel incident rays at these lower wavelengths to a sharp focus which is vitally necessary for the task intended. Various configurations of single uniform curvature diffraction surfaces and combinations thereof have been tried to obtain a sharp focus of the source image but have met with little success. A single concave grating has been used, for example in space experiments at wavelengths from 400 Å down to 50 Å with a collecting area consisting of the directly illuminated part of the grating, but spatial imaging was marginal. More recently the collecting area has been increased in some instances by using a Wolter lens to form an image of which the central portion serves as the source for a concave grating with the lens and grating both operating at grazing incidence, with the final image being built up by scanning. The use of axially symmetric gratings to make efficient use of the axial symmetry of a preceding collecting element has been further proposed.

Only recently have machining techniques advanced to the stage where non-uniform curvatures can be produced on a body surface and diffraction rulings formed thereon.

Accordingly, it is an object of the present invention to provide a new and improved diffraction surface grating;

Another object of the present invention is to provide an aspheric diffraction surface grating for collecting radiation for imaging and/or spectral analysis;

Still another object of the present invention is to provide a concave diffraction surface grating for focusing short wavelength radiation;

A further object of the present invention is to provide a diffraction surface grating for focusing radiation from both near and far sources of electromagnetic energy whose wavelengths are in the region of extreme ultraviolet and soft X-ray radiation.

Briefly, these and other objects are obtained by the subject invention which comprises an aspheric grazing incidence grating surface having a surface of revolution described by a curve which does not have a constant radius of curvature, but is defined by the relationship $$\frac{m\lambda}{\sigma} = [1 + (\frac{dx}{dz})^2]^{-\frac{1}{2}} [\cos\theta_r + \sin\theta_r(\frac{dx}{dz}) - 1],$$

where m is the diffraction order, $\lambda$ is the wavelength, $\sigma$ is the grating ruling interval, x and z are cartesian coordinates of a general point on the diffraction surface described by the curve 20 relative to x and z coordinate axes, $\theta_r$ is the angle that a vector r from the origin to the general point makes with the z axis, and $\theta_n$ is the angle a vector normal to the surface at the general point makes with the z axis. The above equation yields the following solution for constantly spaced rulings $\sigma_0$ on the surface:

$$\frac{dx}{dz} = [x^2(1-A) - Az^2]^{-1}\{x[(x^2+z^2)^{\frac{1}{2}} - z] - A^{\frac{1}{2}}$$
$$[(2-A)(x^2+z^2)^2 - 2z(x^2+z^2)^{3/2}]^{\frac{1}{2}}\}$$

where $A = (m\lambda/\sigma_0)^2$. For a condition of a constant ruling interval $\sigma'$ along the z axis where $\sigma' = \sigma_0[1 + (dx/dz)^2]^{\frac{1}{2}}$ the following solution obtains:

$$(dx/dz) = x^{-1}[(1-A^{\frac{1}{2}})(x^2+z^2)^{\frac{1}{2}} - z]$$

where $A = (m\lambda/\sigma')^2$. When the above relations are observed between the coordinates x and z for a given wavelength, the latter equations define respective families of surfaces which will diffract parallel waves to a sharp focus and vice versa.

DESCRIPTION OF THE PREFERRED EMBODIMENTS

Figure 1:
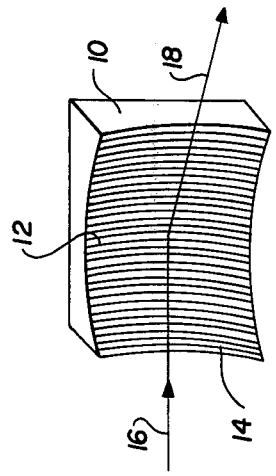
FIG. 1 is a perspective view generally illustrative of a diffraction grating.

Referring now to the drawings where like reference numerals refer to like parts and more particularly to FIG. 1, a diffraction grating typically comprises a plate or support block 10 having a concave spherical diffraction surface 12 upon which is formed grating lines or rulings 14. In accordance with well known technology, if the diffraction condition is met incident radiation 16 will be deflected i.e. diffracted from the surface 12 as radiation 18 for producing an image of the source, not shown, which produces the incident radiation 16.

The present invention departs from prior art diffraction gratings in the surface configuration to be described. In order to focus a given wavelength $\lambda$ of incident radiation to a sharp point focus, the present invention provides a mathematically new surface termed a "diffractoid" surface which differs from previously considered grating surfaces in that it does not have a constant radius of curvature, but rather has a surface of revolution which is defined by a differential equation specified in terms of the diffraction condition dependent on wavelength and ruling spacing instead of the traditional procedure of applying the diffraction condition to surfaces of known constant radii of curvature.

Figure 2:
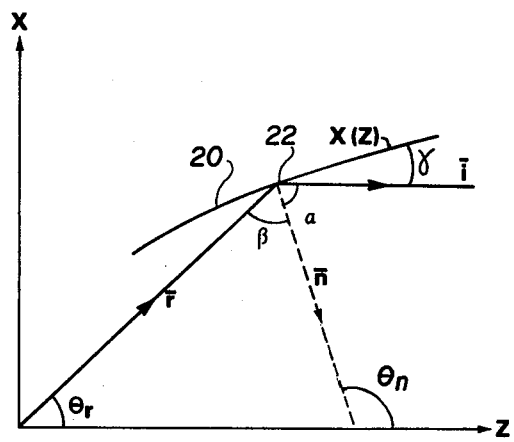
FIG. 2 is a geometrical diagram illustrative of the derivation of the surface curve of the grating according to the subject invention.

This leads to a consideration of FIG. 2 wherein reference numeral 20 denotes an arbitrary curve x(z) drawn in the plane of the cartesian coordinate axes x and z. An arbitrary ray $\bar{r}$ from the origin meets the curve 20 at a general point 22 from which a ray $\bar{n}$ is drawn normal to the curve at that point. Also from the point 22 a ray $\bar{i}$ emerges parallel to the z axis. Furthermore, the requirement is made that the rays $\bar{r}$ and $\bar{i}$ satisfy the diffraction condition wherein $(m\lambda/\sigma) = \sin\alpha + \sin\beta$ where m is the diffraction order, $\lambda$ is the wavelength, $\sigma$ is the ruling interval or spacing of a diffraction grating, angle $\alpha$ is the angle the normal ray $\bar{n}$ at point 22 makes with ray $\bar{i}$ which extends from point 22 parallel to the z axis and angle $\beta$ is the angle the normal ray $\bar{n}$ at point 22 makes with ray $\bar{r}$ which extends from the origin to point 22. It should be noted that angles $\alpha$ and $\beta$ for a diffractoid grating having a non-constant radius of curvature surface such as arbitrary curve 20 does not have the same significance for specifying the system configuration as they do in the case of conventional constant-curvature diffraction gratings such as those having spherical, toroidal, or elliptical surfaces. Angles $\alpha$ and $\beta$ for a diffractoid grating are local variables which vary from point to point along curve 20 while for the conventional diffraction gratings the angles are substantially constant.

If the angles which the rays $\bar{r}$ and $\bar{n}$ make with the z axis are respectively $\theta_r$ and $\theta_n$, it can be geometrically shown that $\alpha = 2\pi - \theta_n$ and $\beta = \theta_r + \pi - \theta_n$. Accordingly, $$m\lambda/\sigma = \sin(2\pi - \theta_n) + \sin(\theta_r + \pi - \theta_n) \quad (1)$$

from which $$m\lambda/\sigma = \sin\theta_n(\cos\theta_r - \sin\theta_r/\tan\theta_n - 1) \quad (2)$$

Since $$\sin\theta_n = [1 + (dx/dz)^2]^{-\frac{1}{2}} \quad (3)$$

and $$-1/\tan\theta_n = dx/dz, \quad (4)$$

Equation (2) becomes $$m\lambda/\sigma = [1 + (dx/dz)^2]^{-\frac{1}{2}}[\cos\theta_r + \sin\theta_r(dx/dz) - 1] \quad (5)$$

Noting that $\sin\theta_r = x/r$ and $\cos\theta_r = z/r$ where $r = (x^2 + z^2)^{\frac{1}{2}}$ and if $(m\lambda/\sigma)^2$ is denoted by A, the following non-linear differential equation is obtained upon squaring both sides:

$$(\frac{x^2}{r^2} - A)(\frac{dx}{dz})^2 - 2\frac{x}{r}(1 - \frac{z}{r})\frac{dx}{dz} +$$
$$\frac{z^2}{r^2} - \frac{2z}{r} - A + 1 = 0. \quad (6)$$

For a constant ruling interval $\sigma_0$ on the curve 20 shown in FIG. 2, a quadratic solution of the non-linear differential equation (6) yields the following expression in dx/dz:

$$\frac{dx}{dz} = [x^2(1-A) - Az^2]^{-1}\{x[(x^2+z^2)^{\frac{1}{2}} - z] - A^{\frac{1}{2}}[(2-A)(x^2+z^2)^2 - 2z(x^2+z^2)^{3/2}]^{\frac{1}{2}}\}. \quad (7)$$

A given solution of differential equation (7) specified by the parameter $m\lambda/\sigma_0$ results in a diffractoidal curve 20 which will cause all incident rays parallel to the z axis and similarly specified by the diffraction condition to be deflected through the origin. A surface of revolution obtained by rotating the curve 20 about the z axis in FIG. 2 will define a diffractoid surface, which surface is denoted by reference numeral 24 in FIG. 5, for example. It should be noted that as parameter A approaches zero meaning that the term $\sigma_0$ approaches infinity, the diffraction condition reduces to simple reflection and accordingly equation (7) reduces to:

$$dx/dz = (r-z)/x \quad (8)$$

which is the differential equation of the parabola. Accordingly for the diffractoid A is greater than zero.

As noted above, the differential equation (7) resulted from the assumption of a constant ruling interval $\sigma_0$ along the curve 20 shown in FIG. 2. If, on the other hand, a constant ruling interval along the z axis is desired, a variable ruling interval $\sigma'$ results along the curve 20 according to the following relationship:

$$\sigma' = \sigma_0[1 + (dx/dz)^2]^{\frac{1}{2}} \quad (9)$$

A solution of the differential equation (5) derived in accordance with equation (9) results in a quadratic expressed in terms of dx/dz and yields an expression simpler in appearance as:

$$dx/dz = x^{-1}[(1-A^{\frac{1}{2}})(x^2+z^2)^{\frac{1}{2}} - z]. \quad (10)$$

As in the earlier case the solution of the differential equation (10) in terms of the parameter A has the property that all incident rays parallel to the z axis will be deflected through the origin.

Figure 3:
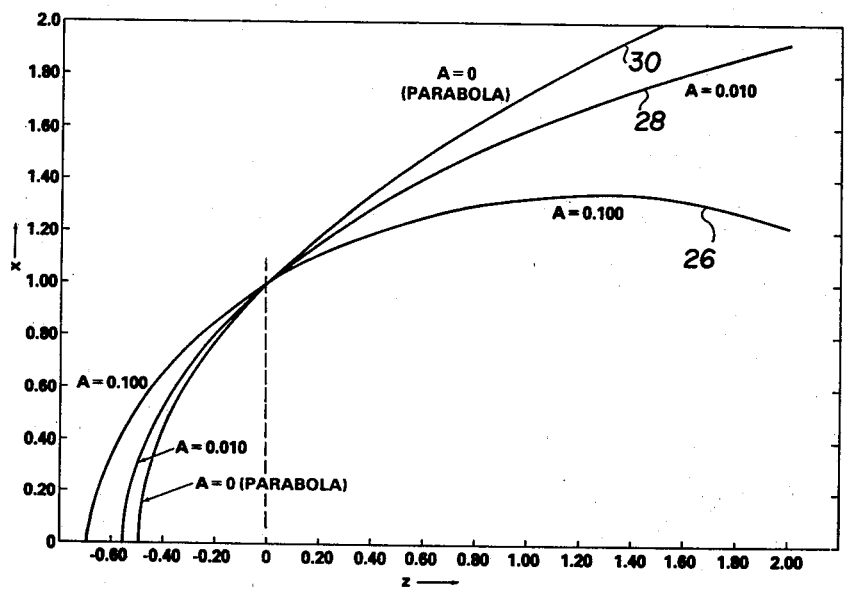
FIG. 3 is a graph illustrative of the comparison of respective surface curves for different grating parameters.

Reference is now made to FIG. 3 which graphically illustrates several solutions of the differential equation (7) which were obtained numerically by a known variable step integration procedure for different values of A, starting with the point z=0, x=1. A comparison of the resulting diffractoidal curves 26, 28 and 30 for the values A=0.100, 0.010, and 0 indicate that as A becomes smaller, the curves flatten out. Furthermore, the curves for A>0 are seen to extend further behind the origin than does the parabola, and in the positive z direction they increase at a slower rate than a parabola (A=0) with the curve A=0.100, for example, actually passing through a maximum and then decreasing.

Figure 4:
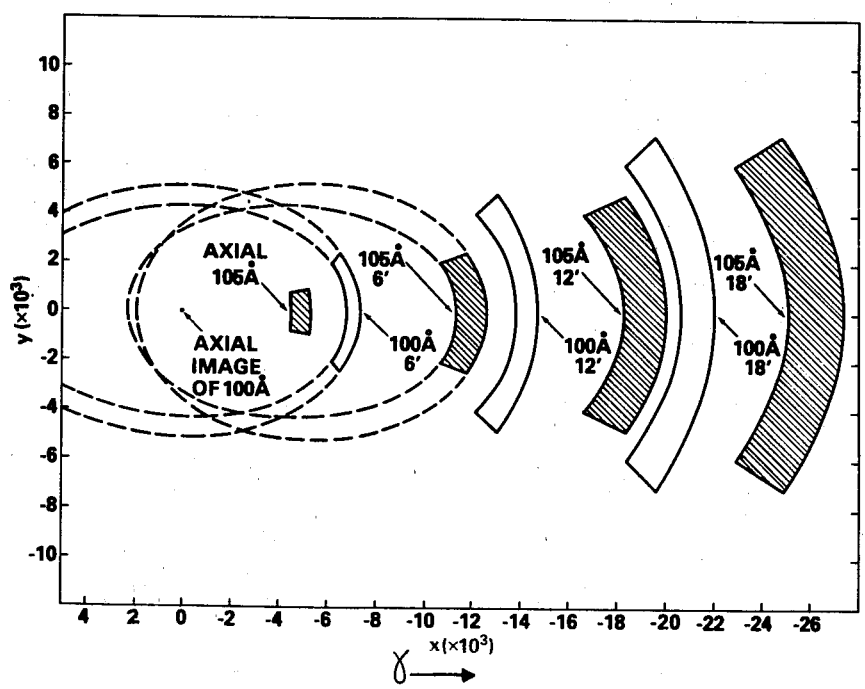
FIG. 4 is a graph illustrative of the spatial and spectral resolution of one typical diffraction surface according to the subject invention.

FIG. 4 shows the imaging characteristics of a diffractoid where A=0.0001, with respect to the axial angle $\gamma$ shown in FIG. 2 for two wavelengths 100 Å and 105 Å. FIG. 4 shows that in the case of a remote point source of 100 Å feeding incident rays corresponding to the ray i shown in FIG. 2 wherein $\gamma=0$, the image will be seen to be a sharply focused point at the origin. However, as the angle $\gamma$ increases through values of 6, 12 and 18 minutes of arc with respect to the z axis, the image spread increases. Likewise, for a point source of 105 Å, the grating parameter A is not matched to the wavelength received so that image spread increases. Thus it can be seen with reference to FIGS. 3 and 4 that the shape of the diffractoid changes in accordance with the grating parameter A and that image spread will occur by either a misalignment or a mismatch of the diffractoid with the incoming radiation. Conversely a sharp focus is achieved by proper alignment and correct value of A. Accordingly, the diffractoid surface can be used not only for imaging distant point sources, such as stars, solar flares, etc. in a desired wavelength, but imaging of near quasi-point sources can also be achieved, the latter property thus enabling focusing of laser beams and also high energy beams for initiating nuclear fusion.

Figure 5:
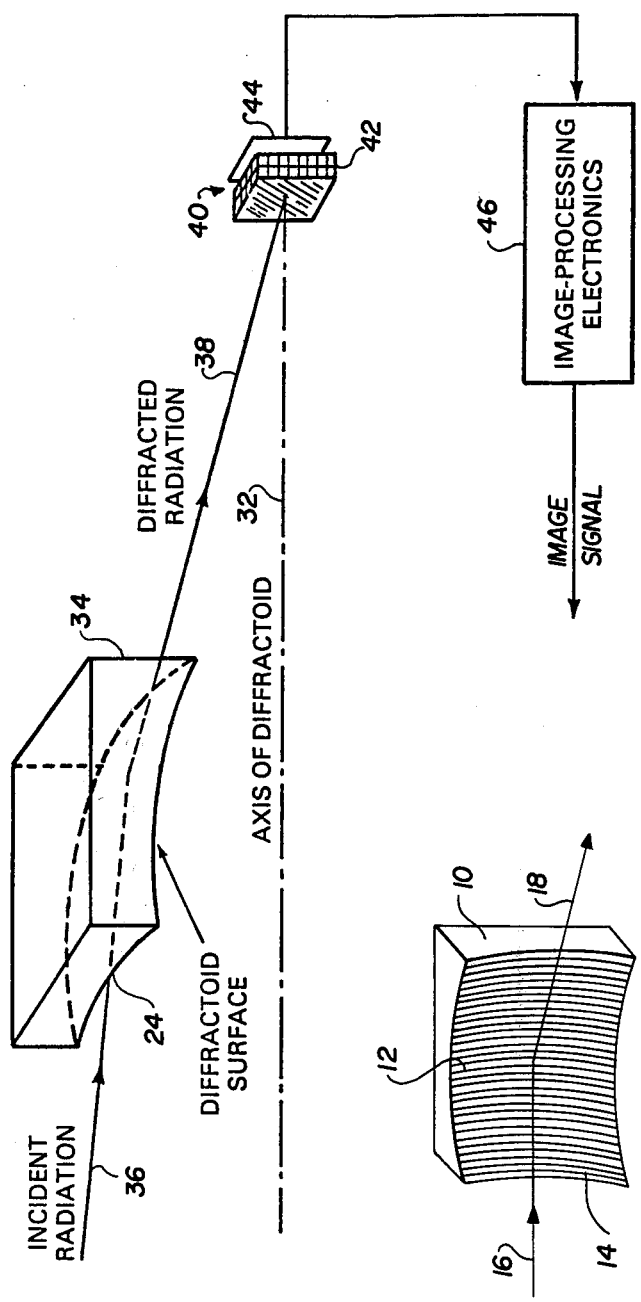
FIG. 5 is a diagram generally illustrative of the diffraction grating according to the subject invention for receiving and focusing energy from a distant source.
Figure 6:
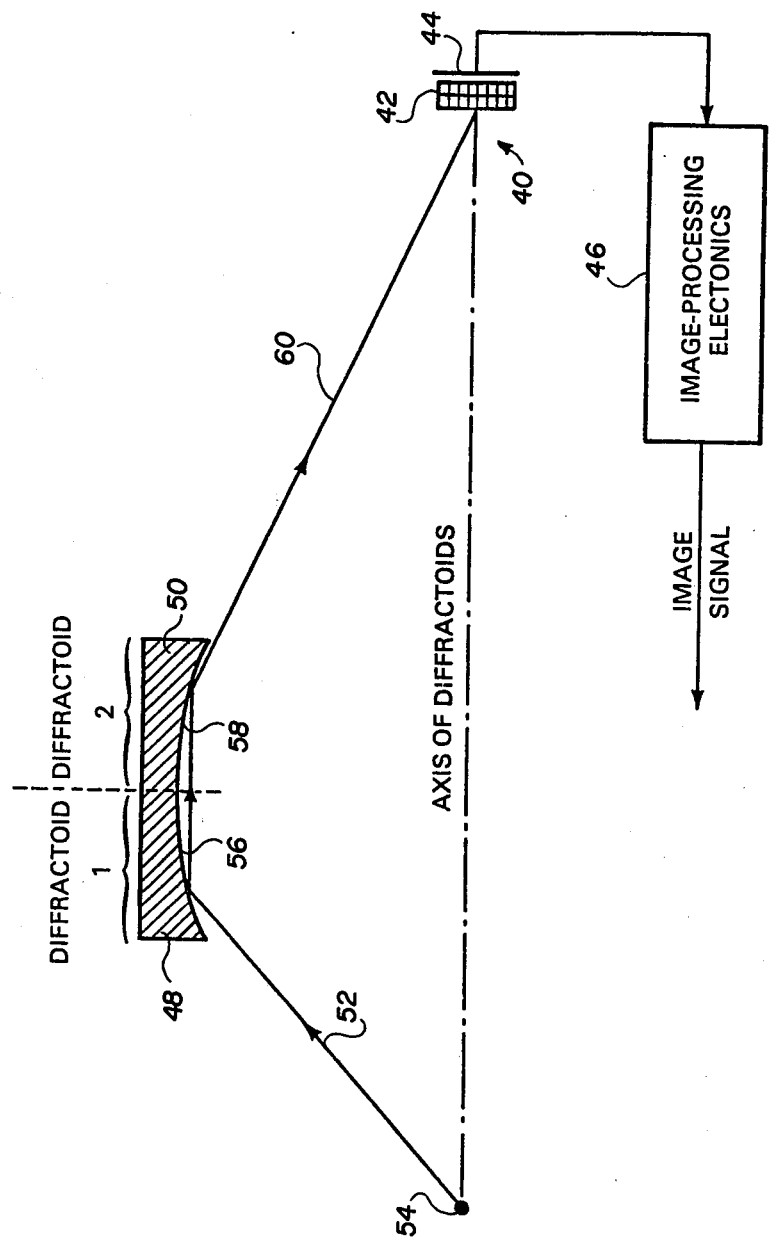
FIG. 6 is a diagram illustrative of a diffraction grating according to the subject invention for receiving and focusing energy from a near source.

To this end, reference is now made to the embodiments shown in FIGS. 5 and 6. In FIG. 5, there is disclosed a single support block 34 having a diffractoid surface 24 corresponding to curve 20 shown in FIG. 2 as defined by the differential equation (5) providing either of the two solutions of equations (7) or (10) depending upon whether the ruling interval is constant along the curve 20 or the axis 32 which corresponds to the z axis of FIG. 2. The support block 34 is preferably comprised of aluminum upon which the aspheric curvature is machined and the diffraction rulings, not shown, are formed on the surface 24. When desirable, the support block 34 may consist of glass upon which the non-uniform curvature is ground and a gold film is applied to the surface and the diffraction rulings subsequently formed thereon. The incident radiation 36 from a distant source is diffracted from the surface 24 in the form of a beam 38 where it impinges on an optical detector 40 consisting of a resistive anode image converter. The detector 40 includes at least one but preferably a pair of micro channel electron multiplier plates 42 used in a cascade chevron configuration behind which is a proximately coupled continuous resistive anode 44. The anode preferably comprises a substrate of glass, ceramic, or epoxy fiberglass upon which is deposited colloidal graphite. The diffracted radiation is detected by the micro channel plates and converted to electrical signals by the anode for processing by conventional imaging processing electronics circuitry 46 which in turn couples an image signal to a suitable display device, not shown. The resistive anode image converter type of detector is preferred because it is simple, small, covers large areas, has high spatial resolution, low noise and excellent linearity. When desirable, other types of detectors can be used e.g. photographic plates and vidicon tubes.

It should be pointed out that the diffractoid surface 24 can be diamond-turned on a thick copper layer deposited on the surface of the support block 34 which itself is first rough machined to shape by a numerically programmed lathe, with the ruling process being accomplished utilizing radial cuts in a well known manner on a lathe which is coaxial with the diffractoid.

As was pointed out, a diffractoid surface has the property that all incident rays parallel to the z axis shown in FIG. 2 or diffractoid axis 32 shown in FIG. 5, will be deflected to a sharply focused point. The converse is also true, meaning that radiation from a point source and directed to the diffractoid surface will be radiated parallel to the diffractoid axis. Accordingly this gives rise to the embodiment shown in FIG. 6 wherein a near or relatively local source can be imaged. Such a configuration employs a pair of diffractoid members 48 and 50, the first of which is adapted to receive radiation 52 from a relatively near source 54, which is diffracted from the surface 56 where it is directed to the surface 58 and diffracted as a finely focused beam 60 to the microchannel plate 42 of the detector 40 whose anode 44 is coupled to the image processing electronics 46.

Thus what has been shown and described is a new type of diffraction grating surface which is adapted to image a given wavelength, when satisfying the appropriate diffraction condition, to a sharp point. Obvious modifications and variations of the apparatus are possible in light of the above teachings. It is to be understood, therefore, that within the scope of the appended claims the invention may be practiced otherwise than as specifically described and illustrated.

Accordingly, I claim as my invention:

1. A diffractord grating means for obtaining stigmatic imaging of a soft X-ray and extreme ultraviolet emitting object at a focal point, comprising;

a support block;

a concave surface formed on a portion of said support block, said concave surface having a non-constant radius of curvature over the entirety thereof, and said non-constant radius of curvature surface having a surface of revolution about a coordinate axis defined by a diffractoidal curve specified in terms of cartesian coordinates x and z having a characteristic such that for a selected grating parameter (A) defined in terms of diffraction order (m), wavelength ($\lambda$) and ruling interval ($\sigma$), all emitted radiation of a specified wavelength from a point source directed substantially parallel to said axis will be deflected to a sharp point at said focal point and conversely, all emitted radiation of said specified wavelength directed from said sharp point at said focal point located at the origin of said cartesian coordinates will be deflected substantially parallel to said axis; and diffraction rulings formed on said non-constant radius of curvature surface having a ruling interval ($\sigma$);

wherein said diffractoidal curve is defined by a solution of a non-linear differential equation expressed in the form $$m\lambda/\sigma = [1+(dx/dz)^2]^{-\frac{1}{2}}[\cos\theta_r + \sin\theta_r(dx/dz) - 1]$$

where $dx/dz$ is the derivative of x with respect to z, $\theta_r$ is the angle a ray (r) from the origin to a point on said curve makes with the z coordinate axis.

2. The diffractoid grating of claim 1 wherein said ruling interval $\sigma$ is substantially constant along said diffractoidal curve.

3. The diffractoid grating of claim 1 wherein said non-linear differential equation is expressed in terms of dx/dz as:

$$\frac{dx}{dz} = [x^2(1-A) - Az^2]^{-1}\{x[(x^2+z^2)^{\frac{1}{2}} - z - A^{\frac{1}{2}}[(2-A)(x^2+z^2)^2 - 2z(x^2+z^2)^{3/2}]^{\frac{1}{2}}\}$$

where $A = (m\lambda/\sigma_0)^2$ and wherein $\sigma_0$ comprises a substantially constant ruling interval along said diffractoidal curve.

4. The diffractoid grating of claim 1 wherein said ruling interval is substantially constant along said z coordinate axis.

5. The diffractoid grating of claim 1 wherein said non-linear differential equation is expressed in terms of dx/dz as:

$$dx/dz = x^{-1}[(1-A^{\frac{1}{2}})(x^2+z^2)^{\frac{1}{2}}-z].$$

where $A=(m\lambda/\sigma')^2$ and wherein $\sigma'$ comprises a substantially constant ruling interval along said z coordinate axis.

6. The diffractoid grating of claim 1 further including optical detector means selectively located for receiving rays from a relatively far point source which are diffracted from said non-constant radius of curvature surface and providing an electrical signal therefrom, and means coupled to said optical detector means and being responsive to said electrical signal for providing an image signal.

7. The diffractoid grating of claim 6 wherein said optical detector means is located substantially at said focal point of said grating surface.

8. The diffractoid grating of claim 6 wherein said optical detector means comprises a resistive anode image converter consisting of at least one microchannel electron multiplier plate and a continuous resistive anode electrically coupled to said plate.

9. The diffractoid grating of claim 8 wherein said resistive anode image converter consists of a pair of cascaded microchannel electron multiplier plates coupled to said anode.

10. The diffractoid grating of claim 1 further including:
    another diffractoid grating having a non-constant radius of curvature surface and having a diffractoidal curve so defined in said claim selectively located relative to the first recited diffractoid grating which receives said emitted radiation from a relatively near source and diffracts said radiation to said another diffractoid grating, said another diffractoid grating in turn providing respective diffracted radiation;
    optical detector means selectively located for receiving said respective diffracted radiation and providing an electrical signal therefrom; and
    means coupled to said optical detector means and being responsive to said electrical signal for producing an image signal.

11. The diffractoid grating of claim 10 wherein said relatively near source is located substantially at the focal point of said first recited diffractoid grating and said optical detector means is located substantially at the focal point of said another diffractoid grating.

12. The diffractoid grating of claim 10 wherein said optical detector means comprises a resistive anode image converter consisting of at least one microchannel electron multiplier plate and a continuous resistive anode electrically coupled to said plate.

13. The diffractoid grating of claim 12 wherein said resistive anode image converter consists of a pair of cascaded microchannel electron multiplier plates coupled to said anode.

* * * * *